US009769803B2

United States Patent
Liu et al.

(10) Patent No.: US 9,769,803 B2
(45) Date of Patent: Sep. 19, 2017

(54) METHODS FOR DEVICE-TO-DEVICE CONNECTION RE-ESTABLISHMENT AND RELATED USER EQUIPMENTS AND RADIO ACCESS NODE

(71) Applicant: Nokia Technologies Oy, Espoo (FI)

(72) Inventors: Yang Liu, Beijing (CN); Kodo Shu, Beijing (CN); Haitao Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/647,030

(22) PCT Filed: Nov. 29, 2012

(86) PCT No.: PCT/CN2012/085542
§ 371 (c)(1),
(2) Date: May 22, 2015

(87) PCT Pub. No.: WO2014/082253
PCT Pub. Date: Jun. 5, 2014

(65) Prior Publication Data
US 2015/0312892 A1    Oct. 29, 2015

(51) Int. Cl.
*H04W 72/04*    (2009.01)
*H04W 36/00*    (2009.01)
(Continued)

(52) U.S. Cl.
CPC ........... *H04W 72/0406* (2013.01); *H04L 9/32* (2013.01); *H04L 65/10* (2013.01); *H04W 12/00* (2013.01);
(Continued)

(58) Field of Classification Search
None
See application file for complete search history.

(56) References Cited

U.S. PATENT DOCUMENTS

| 7,760,882 B2 * | 7/2010 | Tidwell | G06F 21/316 |
| | | | 380/270 |
| 2007/0005972 A1 * | 1/2007 | Mizikovsky | H04L 63/061 |
| | | | 713/171 |

(Continued)

FOREIGN PATENT DOCUMENTS

| CN | 101772199 | 7/2010 |
| CN | 101742577 | 6/2012 |
| WO | 2011147462 | 12/2011 |

*Primary Examiner* — Steven H Nguyen
(74) *Attorney, Agent, or Firm* — Mintz Levin Cohn Ferris Glovksy and Popeo, P.C.

(57) ABSTRACT

Methods for D2D connection re-establishment and related user equipments and radio access node are disclosed, wherein the D2D connection is established between a first user equipment and a second user equipment under the control of a radio access node. In one embodiment, the method comprises: receiving, by the first user equipments, a first message from the second user equipments, the first message comprising a first credential which is calculated by the second user equipment; verifying the first credential by the first user equipment; and sending a second message indicating acknowledgement of the D2D connection re-establishment from the first user equipment to the second user equipment upon successful verification of the first credential.

20 Claims, 6 Drawing Sheets

(51) Int. Cl.
*H04W 76/02* (2009.01)
*H04W 12/00* (2009.01)
*H04W 12/06* (2009.01)
*H04L 9/32* (2006.01)
*H04L 29/06* (2006.01)
*H04W 36/24* (2009.01)
*H04W 88/02* (2009.01)
*H04W 88/08* (2009.01)

(52) U.S. Cl.
CPC ........... *H04W 12/06* (2013.01); *H04W 36/00* (2013.01); *H04W 36/245* (2013.01); *H04W 76/028* (2013.01); *H04W 88/02* (2013.01); *H04W 88/08* (2013.01)

(56) References Cited

U.S. PATENT DOCUMENTS

| | | | | |
|---|---|---|---|---|
| 2007/0008922 A1* | 1/2007 | Abhishek | .............. | H04W 72/02 370/329 |
| 2011/0314287 A1* | 12/2011 | Escott | ................... | H04L 63/061 713/171 |
| 2012/0208571 A1* | 8/2012 | Park | ................... | H04L 67/1063 455/466 |
| 2013/0036231 A1* | 2/2013 | Suumaki | ............... | H04W 12/04 709/228 |
| 2013/0160101 A1* | 6/2013 | Hakola | ............... | H04W 76/023 726/7 |
| 2013/0272182 A1* | 10/2013 | Li | ........................ | H04W 28/02 370/311 |
| 2013/0297810 A1* | 11/2013 | Ho | ...................... | H04W 76/028 709/228 |

\* cited by examiner

METHODS FOR DEVICE-TO-DEVICE CONNECTION RE-ESTABLISHMENT AND RELATED USER EQUIPMENTS AND RADIO ACCESS NODE

RELATED APPLICATION

This application was originally filed as PCT Application No. PCT/CN2012/085542 filed Nov. 29, 2012.

TECHNICAL FIELD OF THE INVENTION

The present invention relates to device-to-device (D2D) communication, and more particularly, to methods for D2D connection re-establishment and related apparatuses.

BACKGROUND OF THE INVENTION

D2D communication is a kind of communication which allows two user equipments to communicate with each other directly, potentially under some control of cellular networks. The two user equipments may be referred to as a D2D pair. The examples of D2D communication include direct communications in a cluster of proximity devices, autonomous D2D communication in a cellular network, etc.

Nowadays, many investigations and researches about supports of network-controlled D2D communication in 3G or 4G radio communication networks, e.g. Long Term Evolution (LTE) network or LTE-Advanced network, have been conducted.

For the D2D communication, D2D Random Access Channel (RACH) is introduced. The radio resources for the D2D RACH can be allocated by a network-side device such as an eNodeB. The D2D RACH would be quite similar to the LTE Physical Uplink Control Channel (PUCCH). One user equipment may utilize the D2D RACH to access the other user equipment directly. Over the D2D RACH, a D2D connection can be established between two user equipments, and the data can be transmitted over the D2D connection.

During the data transmission of the D2D pair, there may be a radio link failure (RLF) on the D2D radio link due to the complexity of heterogeneous network. The D2D radio link tends to suffer from the heavy interference from other D2D pairs or cellular user equipments (assuming cellular uplink band can be also used for D2D communications), so the RLF will be unavoidable.

Generally, after the RLF occurs on the radio link, a connection re-establishment will be initiated to recover the connection. However, the connection re-establishment for a D2D connection is different from the connection re-establishment for a radio resource control (RRC) connection in a cellular network such as LTE network.

In the conventional RRC connection re-establishment procedure, after the RLF or handover failure, the user equipment firstly will select a cell for re-establishment, and then sends a RRC Connection Reestablishment Request to the eNodeB. Then the eNodeB will do verification, and upon successful verification, allocate radio resources for the re-establishment and send a RRC Connection Reestablishment message to the user equipment to update related parameters of signaling radio bearers. Finally after all the parameters are updated successfully, the user equipment will send a RRC Connection Reestablishment Complete message to the eNodeB. So the RRC connection re-establishment procedure happens between the user equipment and the eNodeB, and the verification is done by the eNodeB.

But such the RRC connection re-establishment procedure cannot be applied to the D2D connection re-establishment, because the D2D connection re-establishment happens between the two user equipments.

When the RLF occurs on the D2D radio link, in order to resume the D2D connection, a new connection setup procedure may be initiated for the D2D radio link. But this will cause data loss and possibly involve core network due to generation of a new security key for the D2D communication. This kind of D2D connection re-establishment will have a negative impact on user experience for the D2D communication and also push too much signaling burden to the core network side.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The present invention is directed to methods for D2D connection re-establishment and related user equipments and radio access node.

According to one embodiment, a method for D2D connection re-establishment, the D2D connection being established between a first user equipment and a second user equipment under the control of a radio access node, comprises: receiving, by the first user equipment, a first message from the second user equipment, the first message comprising a first credential which is calculated by the second user equipment; verifying the first credential by the first user equipment; and sending a second message indicating acknowledgement of the D2D connection re-establishment from the first user equipment to the second user equipment upon successful verification of the first credential.

In an exemplary embodiment, the verifying of the first credential can comprise: calculating a second credential; and comparing the first credential with the second credential, wherein the first credential is successfully verified if the first credential is equal to the second credential.

In an exemplary embodiment, the second credential can be calculated in the same way as the first credential.

In an exemplary embodiment, the second credential can be calculated based on at least a security key used for D2D communication between the first and second user equipments, an identifier of the radio access node, and identifiers of the first and second user equipments.

In an exemplary embodiment, the second credential can be calculated based on at least an identifier of an integrity algorithm used for D2D communication between the two user equipments, an identifier of the radio access node, and identifiers of the first and second user equipments.

In an exemplary embodiment, the method can further comprise: reporting success of the D2D connection re-establishment to the radio access node.

According to another embodiment, a method for D2D connection re-establishment, the D2D connection being established between a first user equipment and a second user equipment under the control of a radio access node, comprises: receiving, by the first user equipment, a first message from the radio access node, the first message comprising at least a first credential which is calculated by the second user equipment, radio resource information for the re-establishment, and a process identifier for the re-establishment; verifying the first credential by the first user equipment; sending from the first user equipment to the radio access node a second message indicating acceptance of the re-establishment upon successful verification of the first credential; receiving, by the first user equipment, a third message from the second user equipment, the third message comprising the process identifier; recognizing the re-establishment based on the process identifier by the first user equipment; and sending from the first user equipment to the second user equipment a fourth message indicating acknowledgement of the re-establishment.

In an exemplary embodiment, the second credential can be calculated based on at least a security key used for D2D communication between the first and second user equipments, a physical cell identifier and frequency of a cell within which the first and second user equipments are located.

In an exemplary embodiment, the radio resource information for the re-establishment can be information related to configurations of a D2D random access channel between the first and second user equipments.

According to another embodiment, a method for D2D connection re-establishment, the D2D connection being established between a first user equipment and a second user equipment under the control of a radio access node, comprises: receiving, by the radio access node, a first message from the first user equipment, the first message comprising an indication of a D2D connection re-establishment, a credential calculated by the first user equipment, and an identifier of the second user equipment; allocating a process identifier and radio resources to the re-establishment; sending a second message to the second user equipment, the second message comprising the received credential, the allocated process id and radio resource information for the re-establishment; receiving from the second user equipment a third message indicating acceptance of the re-establishment; and sending to the first user equipment a fourth message comprising the radio resource information and the allocated process identifier, wherein the radio resource information and the process identifier are used by the first user equipment for the re-establishment.

According to another embodiment, a user equipment for D2D connection re-establishment, the D2D connection being established between the user equipment and another user equipment under the control of a radio access node, comprises: at least one processor; and at least one memory including computer program code; the at least one memory and the computer program code configured to, with the at least one processor, cause the user equipment to perform at least the following: receiving a first message from said another user equipment, the first message comprising a first credential which is calculated by said another user equipment; verifying the first credential; and sending a second message indicating acknowledgement of the D2D connection re-establishment to said another user equipment upon successful verification of the first credential.

According to another embodiment, a user equipment for D2D connection re-establishment, the D2D connection being established between the user equipment and another user equipment under the control of a radio access node, comprises: at least one processor; and at least one memory including computer program code; the at least one memory and the computer program code configured to, with the at least one processor, cause the user equipment to perform at least the following: receiving a first message from the radio access node, the first message comprising at least a first credential which is calculated by said another user equipment, radio resource information for the re-establishment, and a process identifier for the re-establishment; verifying the first credential; sending to the radio access node a second message indicating acceptance of the re-establishment upon successful verification of the first credential; receiving a third message from said another user equipment, the third message comprising the process identifier; recognizing the re-establishment based on the process identifier; and sending to said another user equipment a fourth message indicating acknowledgement of the re-establishment.

According to another embodiment, a radio access node for D2D connection re-establishment, the D2D connection being established between a first user equipment and a second user equipment under the control of the radio access node, comprises: at least one processor; and at least one memory including computer program code; the at least one memory and the computer program code configured to, with the at least one processor, cause the radio access node to perform at least the following: receiving a first message from the first user equipments, the first request comprising an indication of a D2D connection re-establishment, a credential calculated by the first user equipment, and an identifier of the second user equipment; allocating a process identifier and radio resources to the re-establishment; sending a second message to the second user equipment, the second message comprising the received credential, the allocated process id and radio resource information for the re-establishment; receiving from the second user equipment a third message indicating acceptance of the re-establishment; and sending to the first user equipment a fourth message comprising the radio resource information and the allocated process identifier, wherein the radio resource information and the process identifier are used by the first user equipment for the re-establishment.

According to another embodiment, a computer program product including one or more sequences of one or more instructions which, when executed by one or more processors, cause an apparatus to at least perform the steps of a method for D2D connection re-establishment.

According to another embodiment, an apparatus for D2D connection re-establishment, the D2D connection being established between the apparatus and a user equipment under the control of a radio access node, comprises: means for receiving a first message from the user equipment, the request comprising a first credential which is calculated by the user equipment; means for verifying the first credential; and means for sending a response indicating acknowledgement of the D2D connection re-establishment to the user equipment upon successful verification of the first credential.

According to another embodiment, an apparatus for D2D connection re-establishment, the D2D connection being established between the apparatus and a user equipment under the control of a radio access node, comprises: means for receiving a first message from the radio access node, the first message comprising at least a first credential which is calculated by the user equipments, radio resource information for the re-establishment, and a process identifier for the re-establishment; means for verifying the first credential; means for sending to the radio access node a second message indicating acceptance of the re-establishment upon successful verification of the first credential; means for receiving a third message from the second user equipment, the third message comprising the process identifier; means for recognizing the re-establishment based on the process identifier; and means for sending to the second user equipment a fourth message indicating acknowledgement of the re-establishment.

According to another embodiment, an apparatus for D2D connection re-establishment, the D2D connection being established between a first user equipment and a second user equipment under the control of a radio access node, comprises: means for receiving a first message from the first user equipment, the first request comprising an indication of a D2D connection re-establishment, a credential calculated by the first user equipment, and an identifier of the second user equipment; means for allocating a process identifier and radio resources to the re-establishment; means for sending a second message to the second user equipment, the second message comprising the received credential, the allocated process identifier and radio resource information for the re-establishment; means for receiving from the second user equipment a third message indicating acceptance of the re-establishment; and means for sending to the first user equipment a fourth message comprising the radio resource information and the allocated process identifier, wherein the radio resource information and the process identifier are used by the first user equipment for the re-establishment.

Generally, all terms used in this specification are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those skilled in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE EMBODIMENTS

In the following description of the various illustrative embodiments, reference is made to the accompanying drawings, which form a part thereof, and in which are shown by way of illustration various exemplary embodiments in which the invention may be practiced. It is to be understood that other embodiments may be utilized and structural and functional modifications may be made without departing from the scope of the present invention.

Figure 1:
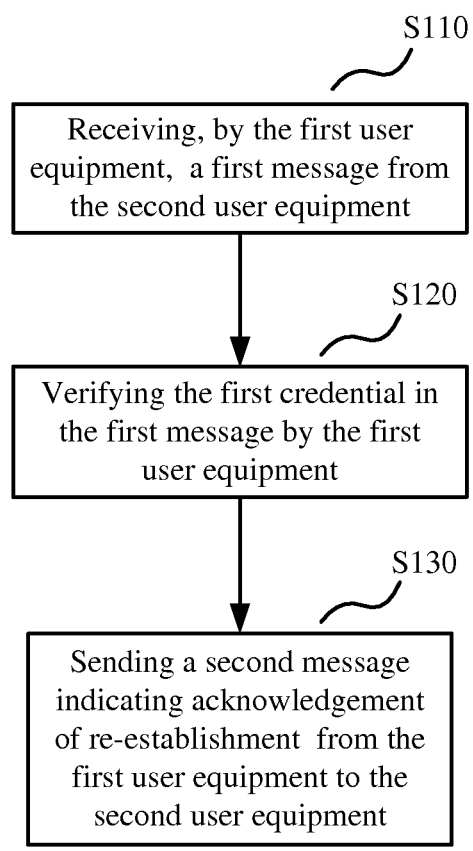
FIG. 1 is a flow chart illustrating the method for D2D connection re-establishment according to an exemplary embodiment of the present invention.

FIG. 1 shows a flow chart illustrating the method for D2D connection re-establishment according to an exemplary embodiment of the present invention. This embodiment will be described in detail in conjunction with the figure.

In this embodiment, the D2D connection is established between a first user equipment and a second user equipment (the first and second user equipments forms a D2D pair) under the control of a radio access node. A D2D service can be communicated over the D2D connection. If the RLF happens on the D2D radio link, the D2D connection re-establishment will be initiated by any one of the D2D pair.

As shown in FIG. 1, at step S110, the first user equipment receives a first message from the second user equipment, wherein the first message comprises a first credential which is calculated by the second user equipment. The first message can be regarded as a re-establishment request.

In one implementation, the first credential can be calculated based on at least a security key used for the D2D communication between the first and second user equipments, an identifier of the radio access node, and identifiers of the first and second user equipments. In this case, the security key and the identifiers of the radio access node and two user equipments can be input as parameters of a Key Derivation Function (KDF) to calculate the first credential. The security key can be the security key used for the D2D communication before the RLF happens. The identifiers of the radio access node or user equipment can be any kind of identifiers which uniquely indentifies the radio access node or the user equipment.

In another implementation, the first credential can be calculated based on at least an identifier of an integrity algorithm used for the D2D communication between the first and second user equipments, an identifier of the radio access node, and identifiers of the first and second user equipments. In this case, the identifier of the integrity algorithm and the identifiers of the radio access node and user equipments can be input as parameters of a KDF to calculate the first credential. The integrity algorithm can be an EIA algorithm or any other integrity algorithm used before the RLF happens.

Upon receipt of the first message, at step S120, the first user equipment will verify the first credential to recognize the second user equipment.

In this step S120, firstly the first user equipment may calculate a second credential. The second credential can be calculated in the same way as the first credential. The two implementations of the calculation of the first credential have already been described above. In the case that the first credential can be calculated by means of any one implementation, the second credential would be calculated utilizing the same implementation. In other words, if the first credential is calculated in the way as the first implementation, the second credential will also be calculated based on the security key and the identifiers of the radio access node and user equipments. If the first credential is calculated in the way as the later implementation, the second credential will also be calculated based on the identifier of the integrity algorithm and the identifiers of the radio access node and user equipments. Then the one user equipment may compare the first credential with the second credential. If the first credential is equal to the second credential, the first credential is successfully verified. If the first credential is not equal to the second credential, the verification fails.

When the verification of the first credential is successful, at step S130, the first user equipment sends a second message indicating acknowledgement of the D2D connection re-establishment to the second user equipment via the D2D link. The second message can be regarded as a re-establishment acknowledgement message. Thus the D2D connection between the first and second user equipments is re-established.

In this embodiment, the D2D connection re-establishment is performed utilizing radio resources for re-establishment allocated by the radio access node during the D2D connection setup. The radio resources may be configurations of the D2D RACH between the first and second user equipments.

Optionally, after the D2D connection re-establishment is completed, the first user equipment may report a result of the D2D connection re-establishment to the radio access node. Preferably, the first user equipment may report only success of the D2D connection re-establishment. Based on the success of the D2D connection re-establishment, the radio access node may re-allocate the radio resources to the D2D pair, and notify the user equipments of updating the radio resources.

It can be seen from the above description that the method of the embodiment is an autonomous D2D connection re-establishment procedure without the participation of the network side device such as the radio access node, thereby avoiding increasing working load to the network side device. The method of this embodiment can be applied to the case where the two user equipments are close enough and beacon broadcast by the first user equipment can be received by the second user equipment. With the method, the D2D connection recovery can be accelerated and the data loss will be reduced, and thus the user experience for the D2D communication will be improved.

Figure 2:
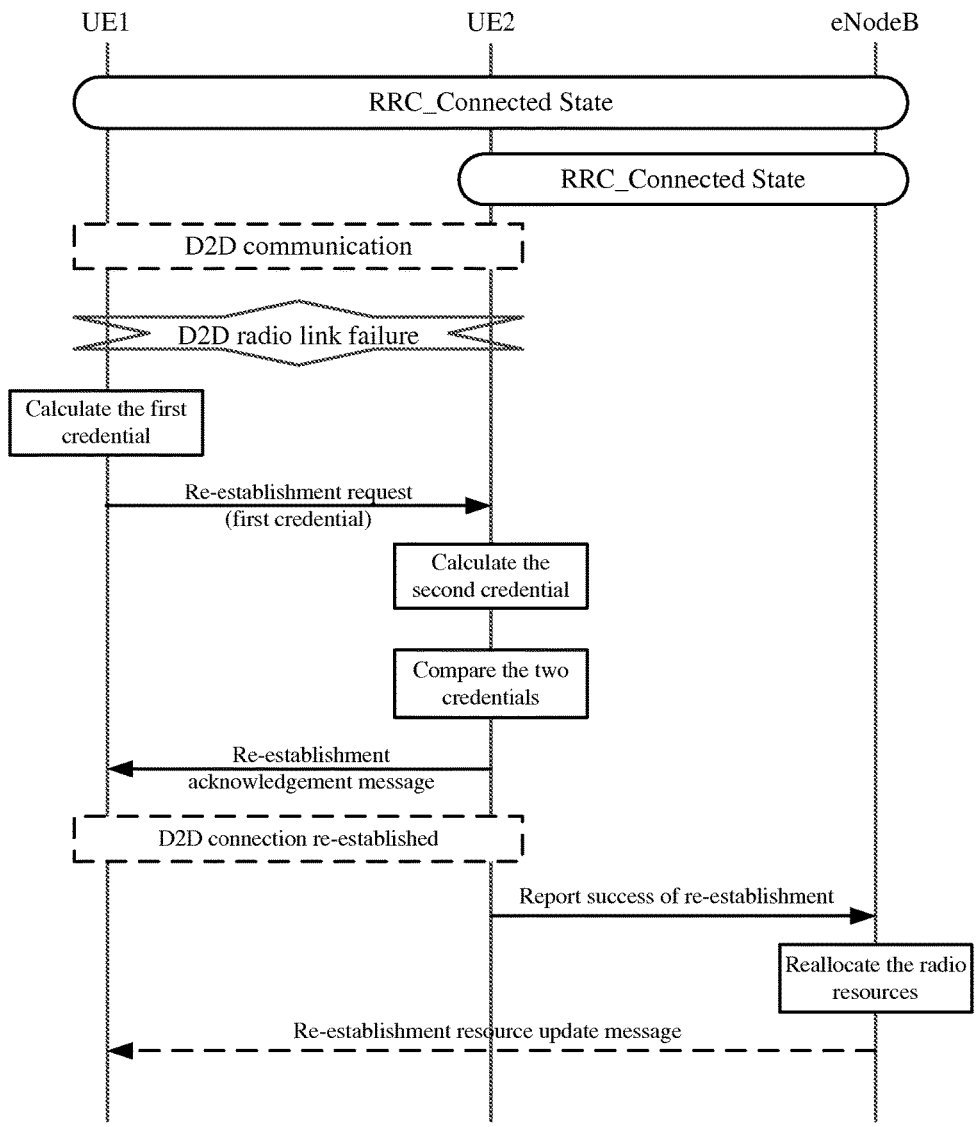
FIG. 2 is a signal chart illustrating a D2D connection re-establishment procedure without participation of an eNodeB.

FIG. 2 is a signal chart illustrating the D2D connection re-establishment procedure without participation of the radio access node, in which the method of the embodiment shown in FIG. 1 is implemented. As shown in FIG. 2, the user equipment UE1 and the user equipment UE2 are both in RRC_Connected state with the eNodeB which is used as the radio access node. The D2D connection is established between the user equipments UE1 and UE2 under the control of the eNodeB. The user equipments UE1 and UE2 can use a security key to cipher the communication on the D2D connection.

Generally, during the D2D communication, one of the D2D pair will broadcast beacon. The user equipment of the D2D pair which broadcasts the beacon may be referred to as a master user equipment, and the other user equipment of the D2D pair may be referred to as a slave user equipment. In this example, assume that the user equipment UE2 is the master user equipment, and the user equipment UE1 is the slave user equipment.

When the RLF occurs on the D2D radio link, the D2D connection will be broken, and the ongoing D2D service will be stopped. If the user equipment UE1 detects that the beacon broadcast by the user equipment UE2 is still available, the user equipment UE1 would calculate the first credential and send the re-establishment request comprising the first credential to the user equipment UE2. The user equipment UE2 receives the re-establishment request, and verifies the first credential in the re-establishment request. The user equipment UE2 may calculate the second credential in the same way as the first credential, and compare the two credentials. If the two credentials are equal, the user equipment UE2 will send the re-establishment acknowledgement message to the user equipment UE1 over the D2D link to acknowledge the success of the re-establishment. Thus the D2D connection is re-established, and the D2D service will be resumed.

In addition, the user equipment UE2 may report the result of the re-establishment to the eNodeB. The eNodeB may re-allocate the radio resources for re-establishment to the two user equipment UE1, UE2 when the re-establishment is successful, and notify the user equipment UE1 to update the radio resources through a re-establishment resource update message.

Figure 3:
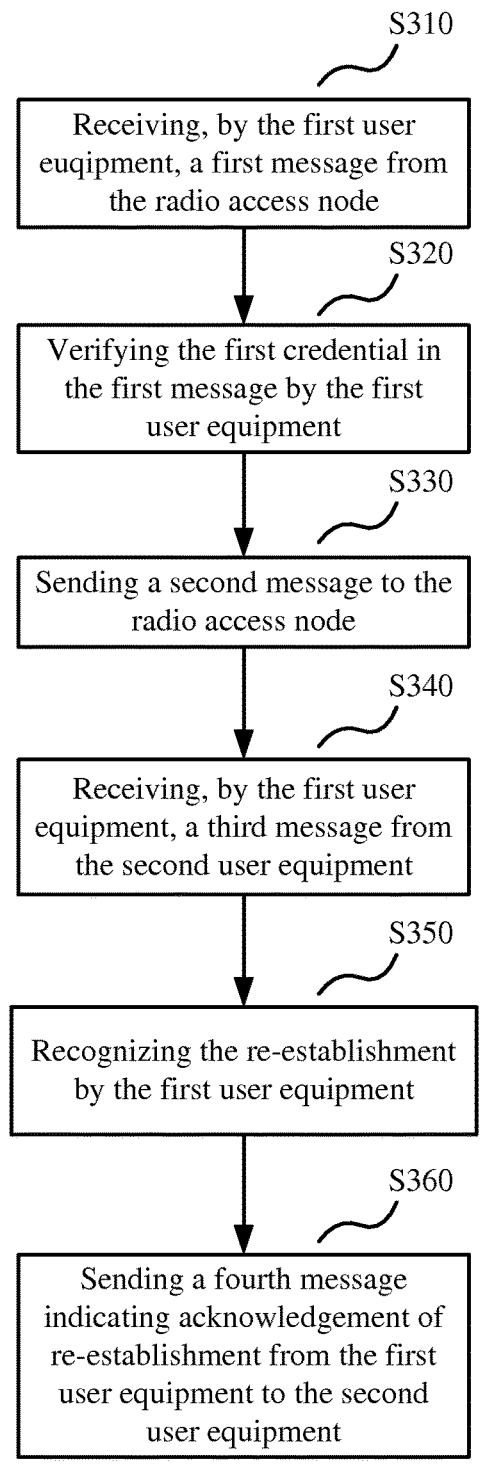
FIG. 3 is a flow chart illustrating the method for D2D connection re-establishment according to another exemplary embodiment of the present invention.

FIG. 3 is a flow chart illustrating the method for D2D connection re-establishment according to another exemplary embodiment of the present invention. This embodiment will be described in detail in conjunction with the figure.

In this embodiment, the D2D connection is established between the first and second user equipments under the control of the radio access node. The D2D service can be communicated over the D2D connection. If the RLF happens on the D2D radio link, the D2D connection re-establishment will be initiated by any one of the D2D pair.

As shown in FIG. 3, at step S310, the first user equipments receives a first message from the radio access node, wherein the first message comprises at least a first credential which is calculated by the second user equipments, radio resource information for the re-establishment, and a process identifier for the re-establishment.

In this embodiment, the first message will be ciphered and integrity protected, for example, with a security key used for the cellular communication between the first user equipment and the radio access node. For example, in the LTE or LTE-Advanced network, the security key could be an Evolved Packet System key for the EPS service. The first message can be transmitted over a radio resource control connection between the first user equipment and the radio access node. The first message can be regarded as a re-establishment request and may be in the form of any downlink radio resource control message, such as DL Information Transfer message.

The first credential can be calculated based on at least a security key used for D2D communication between the first and second user equipments, a physical cell identifier (PCI) and frequency of a cell within which the first and second user equipments are located. The original security key can be the security key used for the D2D communication before the RLF happens.

The radio resource information relates to the radio resources allocated by the radio access node for the D2D connection re-establishment. The radio resources may be configurations of the D2D RACH between the first and second user equipments.

The process identifier can be used to identify the D2D connection re-establishment for the re-establishment and can be allocated by the radio access node.

After receiving the first message, at step S320, the first user equipment verifies the first credential in the first message. Firstly, the first user equipment calculates a second credential. The second credential can be calculated in the same way as the first credential. Then the first user equipment compares the first credential with the second credential. If the first and second credentials are equal, the first credential is successfully verified, and the first user equipment will accept the re-establishment. If the first and second credentials are not equal, the verification of the first credential fails, and the re-establishment will be denied.

When the verification of the first credential is successful, at step S330, the first user equipment sends a second message indicating acceptance of the re-establishment to the radio access node. The second message may be regarded as a re-establishment acceptance message, and may be in the form of any uplink radio resource control message, such as UL Information Transfer message.

Then at step S340, the first user equipment receives a third message from the second user equipment, wherein the third message comprises the process identifier. The third message can also be regarded as a re-establishment request.

Upon receipt of the third message, at step S350, the first user equipment recognizes the re-establishment based on the process identifier in the third message. In this embodiment, the first user equipment may utilize the process identifier to recognize the second use equipment with which the D2D connection is to be re-established.

Then at step S360, the first user equipment sends a fourth message indicating acknowledgement of the re-establishment to the second user equipment. The fourth message can be regarded as a re-establishment acknowledgement message. Thus the D2D connection is re-established.

It can be seen from the above description that the method of this embodiment is a network-controlled re-establishment procedure in which the radio access node participates in the D2D connection re-establishment. With this method of the embodiment, the D2D connection recovery can be accelerated, and the user experience for the D2D communication can be improved.

Figure 4:
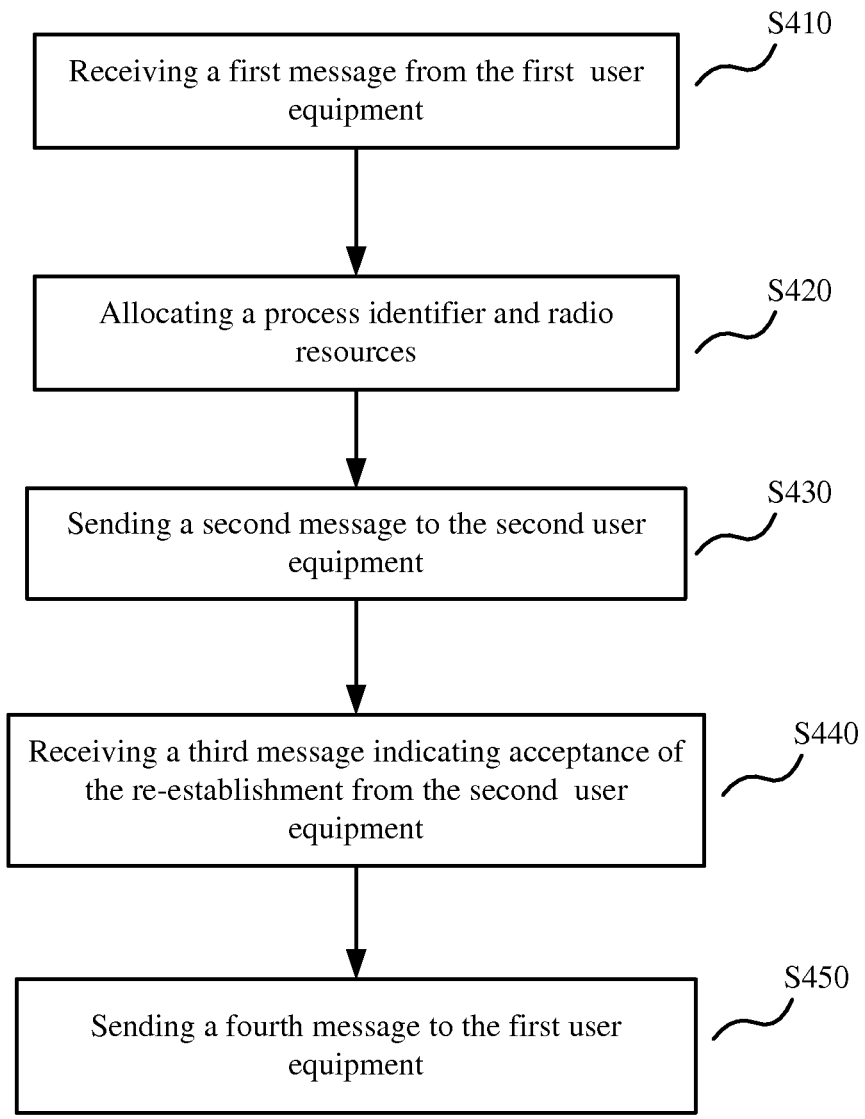
FIG. 4 is a flow chart illustrating the method for D2D connection re-establishment according to another exemplary embodiment of the present invention.

FIG. 4 is a flow chart illustrating the method for D2D connection re-establishment according to another exemplary embodiment of the present invention. This embodiment will be described in detail in conjunction with the figure. For the parts that are same as those in the previous embodiment, the description thereof will be properly omitted.

In this embodiment, the D2D connection is established between the first and second user equipments under the control of the radio access node. When the RLF happens on the D2D radio link between the first and second user equipments, the D2D connection re-establishment will be initiated by any one of the first and second user equipments.

As shown in FIG. 4, at step S410, the radio access node receives a first message from the first user equipment, wherein the first message comprises an indication of a D2D connection re-establishment, a credential calculated by the first user equipment, and an identifier of the second user equipment.

The first message can be ciphered and integrity protected, for example, with the security key used for the cellular communication between the radio access node and the first user equipment. The ciphered and integrity protected first message can be transmitted over the radio resource control connection between the first user equipment and the radio access node. The first message can be regarded as a re-establishment request and can be in the form of any uplink radio resource control message.

The indication is used to indicate that the re-establishment is for the D2D connection so as to distinguish from the conventional radio resource control connection re-establishment. The calculation of the credential is same as that in the method of the embodiment shown in FIG. 3.

After receiving the first message, at step S420, the radio access node allocates a process identifier and radio resources to the re-establishment. As described above, the process identifier can uniquely determine the re-establishment. The radio resources can be configurations of the D2D RACH between the first and second user equipments which will be used by the first user equipment to re-establish the D2D connection.

Then at step S430, the radio access node sends a second message to the second user equipment, the second message comprises the received credential, the allocated process id and radio resource information for the re-establishment. In this embodiment, the second message can be ciphered and integrity protected, for example, with the security key used for the cellular communication between the radio access node and the second user equipment. The ciphered and integrity protected second message can be transmitted over the radio resource control connection between the radio access node and the second user equipment. The second message can also be regarded as a re-establishment request and can be in the form of any downlink radio resource control message.

At step S440, the radio access node receives a third message indicating acceptance of the re-establishment from the second user equipment. The third message can be regarded as a re-establishment acceptance message and may be in the form of any uplink radio resource control message.

Then at step S450, the radio access node sends to the first user equipment a fourth message comprising the radio resource information and the allocated process identifier. The radio resource information and the process identifier can be used by the first and second user equipments for the re-establishment. The fourth message can be ciphered and integrity protected with the security key used for the cellular communication between the radio access node and the first user equipment. The ciphered and integrity protected fourth message can be transmitted over the radio resource control connection between the radio access node and the first user equipment. The fourth message can be regarded as a re-establishment message and can be in the form of any downlink radio resource control message.

It can be seen from the above description that in the method of the embodiment the radio access node acts as a relay and coordinator for the D2D connection re-establishment, so that the re-establishment can be under the control of the radio access node. Even if the first and second user equipments as the D2D pair are not close enough, the D2D connection re-establishment can be implemented to recover the D2D connection under the control of the radio access node.

Figure 5:
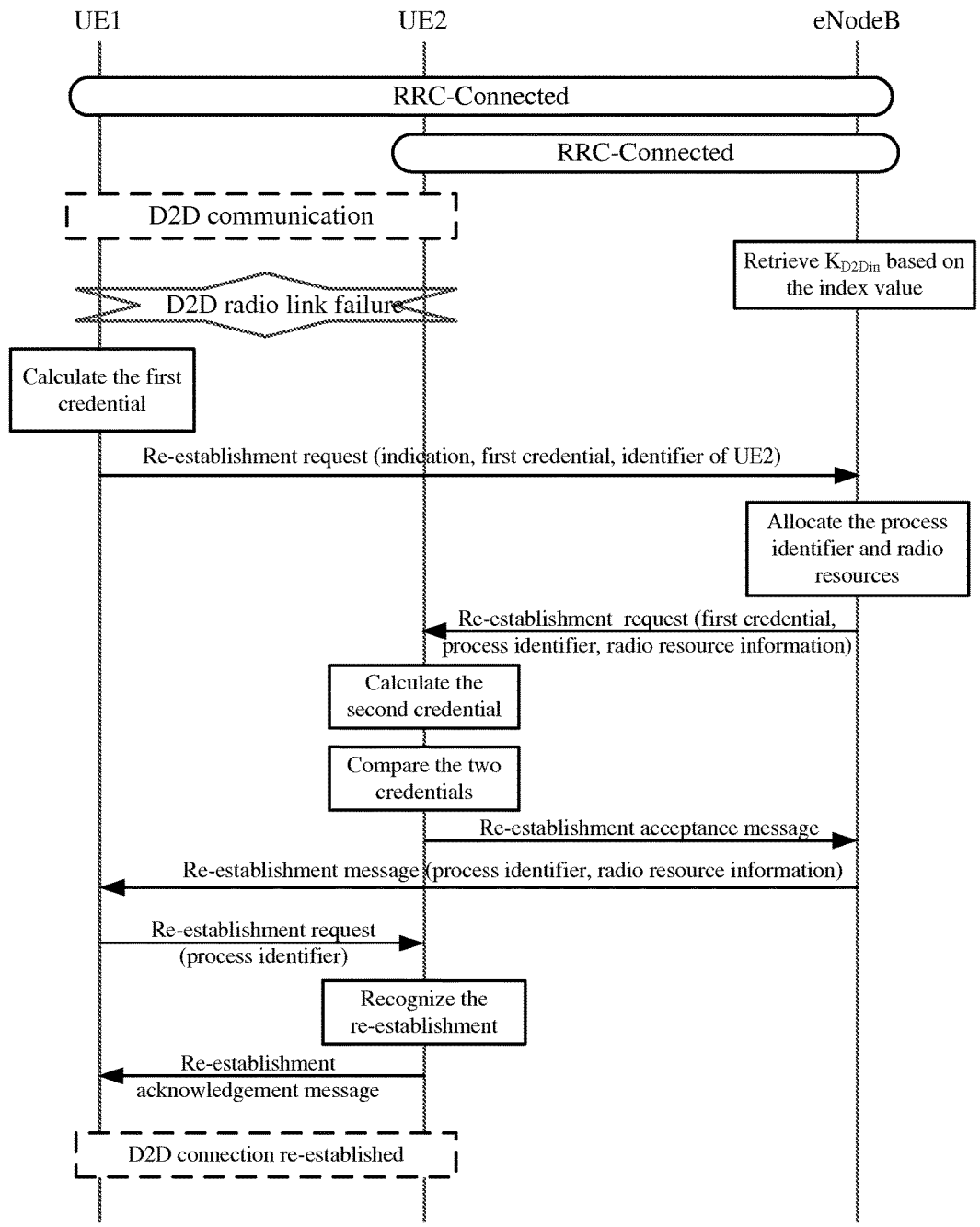
FIG. 5 is a signal chart illustrating a D2D connection re-establishment procedure under the control of an eNodeB.

FIG. 5 shows a signal chart illustrating the D2D connection re-establishment procedure under the control of the radio access node, in which the methods of the embodiments shown in FIGS. 3, 4 are implemented. As shown in FIG. 5, the user equipment UE1 and the user equipment UE2 are both in RRC_Connected state with the eNodeB which is used as the radio access node. The D2D connection is established between the user equipments UE1 and UE2 under the control of the eNodeB. The user equipments UE1 and UE2 can use a security key to cipher the communication on the D2D connection.

In FIG. 5, when the RLF occurs on the D2D radio link, assume the user equipment UE1 initiates the D2D connection re-establishment procedure. The user equipment UE1 may calculate the first credential and send the re-establishment request to the eNodeB. The re-establishment request may comprise the indication of the D2D connection re-establishment, the calculated first credential and the identifier of the user equipment UE2.

The eNodeB receives the re-establishment request, and allocates the process id to the re-establishment. Further the eNodeB may allocate the radio resources, such as the configurations of the D2D RACH between the two user equipments UE1, UE2, to the re-establishment. Then the eNodeB send another re-establishment request to the user equipment UE2. The sent re-establishment request can comprise the first credential, the allocated process identifier, and the information related to the allocated radio resources.

The user equipment UE2 receives the re-establishment request. Then the user equipment UE2 may calculate the second credential in the same way as the first credential, and compare the two credentials. When the first credential is equal to the second credential, the user equipment UE2 may send the re-establishment acceptance message to the eNodeB to indicate that the re-establishment is accepted.

After receiving the re-establishment acceptance message, the eNodeB may send the re-establishment message to the user equipment UE1. The re-establishment message can comprise the radio resource information and the process identifier. The radio resource information can be utilized by the user equipment UE1 to re-establish the D2D connection.

The user equipment UE1 may send the re-establishment request to the user equipment UE2 to request the re-establishment. The re-establishment request can comprise the process identifier. The user equipment UE2 may utilize the process identifier to recognize the re-establishment and accordingly recognize the user equipment UE1. Upon recognition of the re-establishment and the user equipment UE1, the user equipment UE2 may send the re-establishment acknowledgement message to the user equipment UE1 to acknowledge the re-establishment. Thus the D2D connection between the user equipments UE1, UE2 can be re-established.

Figure 6:
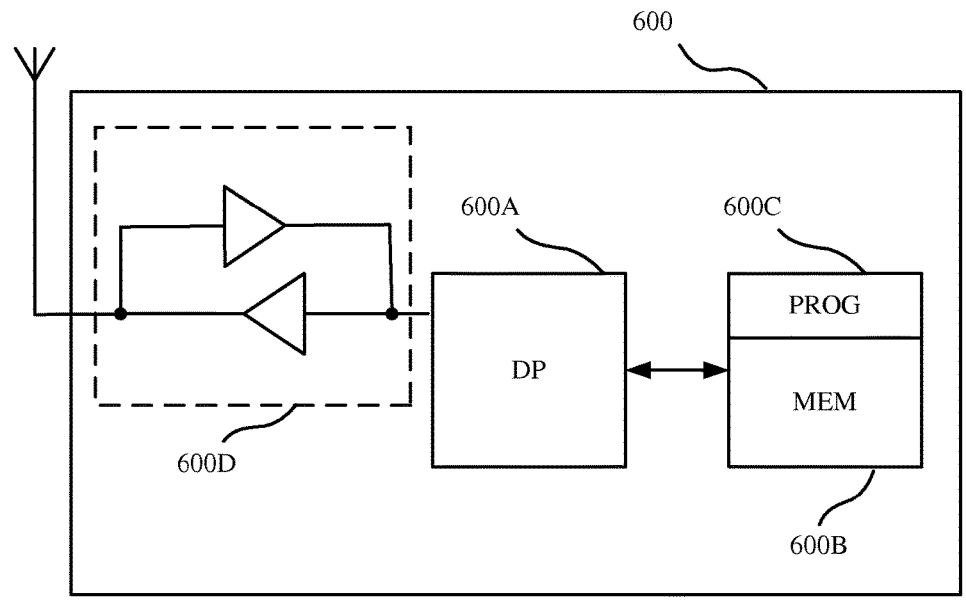
FIG. 6 is a schematic block diagram illustrating the user equipment according to an exemplary embodiment of the present invention.

FIG. 6 is a schematic block diagram illustrating the user equipment 600 according to an exemplary embodiment of the present invention. In FIG. 6, the user equipment 600 may comprise a data processor (DP) 600A, a memory (MEM) 600B that stores a program (PROG) 600C, a transceiver 600D and an antenna.

At least one of the PROG 600C is assumed to comprise program instructions that, when executed by the associated DP 600A, enable the user equipment 600 to operate in accordance with the exemplary embodiment of the method shown in FIG. 1, as discussed above. That is, the exemplary embodiment of the method shown in FIG. 1 may be implemented at least in part by computer software executable by the DP 600A of the user equipment 600, or by hardware, or by a combination of software and hardware.

Also, the program instructions can enable the user equipment 600 to operate in accordance with the exemplary embodiment of the method shown in FIG. 3.

Figure 7:
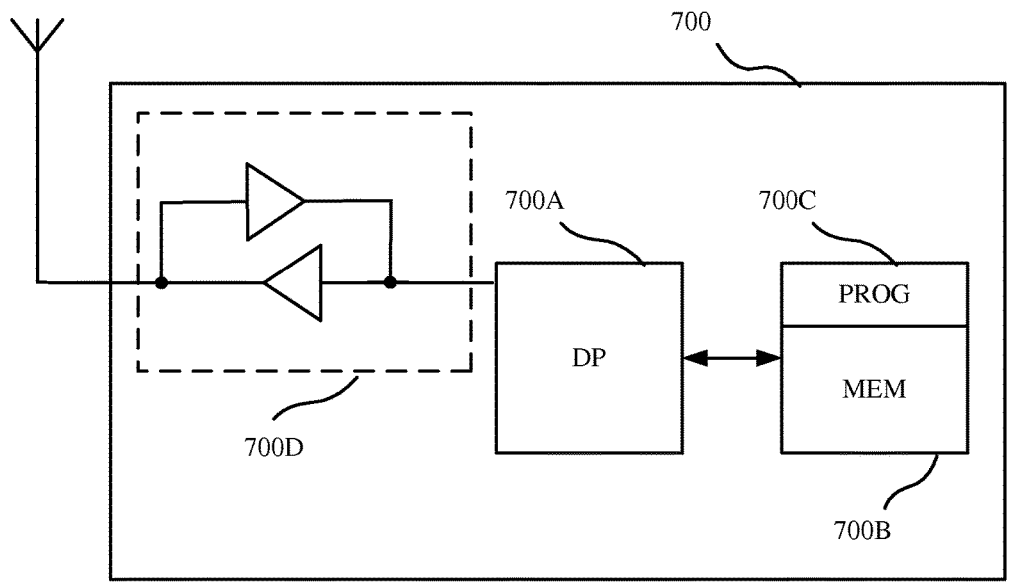
FIG. 7 is a schematic block diagram illustrating the radio access node according to an exemplary embodiment of the present invention.

FIG. 7 is a schematic block diagram illustrating the radio access node 700 according to an exemplary embodiment of the present invention. In FIG. 7, the radio access node 700 may comprise a data processor (DP) 700A, a memory (MEM) 700B that stores a program (PROG) 700C, a transceiver 700D and an antenna.

At least one of the PROG 700C is assumed to comprise program instructions that, when executed by the associated DP 700A, enable the radio access node 1200 to operate in accordance with the exemplary embodiment of the method shown in FIG. 4, as discussed above. That is, the exemplary embodiment of the method shown in FIG. 4 may be implemented at least in part by computer software executable by the DP 700A of the radio access node 700, or by hardware, or by a combination of software and hardware.

The MEM 600B, 700B may be of any type suitable to the local technical environment and may be implemented using any suitable data storage technology, such as semiconductor based memory devices, flash memory, magnetic memory devices and systems, optical memory devices and systems, fixed memory and removable memory. The DP 600A, 700A may be of any type suitable to the local technical environment, and may comprise one or more of general purpose computers, special purpose computers, microprocessors, digital signal processors (DSPs) and processors based on multi-core processor architectures, as non-limiting examples.

Alternatively or optionally, according to an exemplary embodiment of the invention, an apparatus for D2D connection re-establishment can be provided, wherein the D2D connection is established between the apparatus and a user equipment under the control of a radio access node. The apparatus can comprise: means for receiving a first message from the user equipment, the request comprising a first credential which is calculated by the user equipment; means for verifying the first credential; and means for sending a response indicating acknowledgement of the D2D connection re-establishment to the user equipment upon successful verification of the first credential.

Alternatively or optionally, according to an exemplary embodiment of the invention, an apparatus for D2D connection re-establishment can be provided, wherein the D2D connection is established between the apparatus and a user equipment under the control of a radio access node. The apparatus can comprise: means for receiving a first message from the radio access node, the first message comprising at least a first credential which is calculated by the user equipment, radio resource information for the re-establishment, and a process identifier for the re-establishment; means for verifying the first credential; means for sending to the radio access node a second message indicating acceptance of the re-establishment upon successful verification of the first credential; means for receiving a third message from the user equipment, the third message comprising the process identifier; means for recognizing the re-establishment based on the process identifier; and means for sending to the user equipment a fourth message indicating acknowledgement of the re-establishment.

Alternatively or optionally, according to an exemplary embodiment of the invention, an apparatus for D2D connection re-establishment can be provided, wherein the D2D connection is established between a first user equipment and a second user equipment under the control of a radio access node. The apparatus can comprise: means for receiving a first message from the first user equipment, the first request comprising an indication of a D2D connection re-establishment, a credential calculated by the first user equipment, and an identifier of the second user equipments; means for allocating a process identifier and radio resources to the re-establishment; means for sending a second message to the second user equipment, the second message comprising the received credential, the allocated process id and radio resource information for the re-establishment; means for receiving from the second user equipment a third message indicating acceptance of the re-establishment; and means for sending to the first user equipment a fourth message comprising the radio resource information and the allocated process identifier, wherein the radio resource information and the process identifier are used by the first user equipment for the re-establishment.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the invention may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention comprises any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. An apparatus, comprising:
   at least one processor; and
   at least one memory including computer program code, which when executed by the at least one processor, causes the apparatus to at least:
   receive, from another apparatus, a first message, the first message comprising a first credential calculated by the other apparatus, the first message being responsive to a failure of a device-to-device communication between the apparatus and the other apparatus, the first credential being calculated based at least on a ciphering applied to the device-to-device communication between the apparatus and the other apparatus, and the device-to-device communication being under the control of a radio access node;
   verify the first credential by at least comparing the first credential to a second credential calculated by the apparatus, the second credential being calculated based at least on the ciphering applied the device-to-device communication between the apparatus and the other apparatus; and
   re-establish the device-to-device communication between the apparatus and the other apparatus by at least sending, to the other apparatus, a second message indicating acknowledgement of the re-establishing of the device-to-device communication, when the apparatus successfully verifies the first credential.

2. The apparatus according to claim 1, wherein the apparatus is further caused to at least:
   calculate the second credential; and
   compare the first credential with the second credential, wherein the first credential is successfully verified if the first credential is equal to the second credential.

3. The apparatus according to claim 1, wherein the ciphering applied to the device-to-device communication comprises a security key used to cipher the device-to-device communication between the apparatus and the other apparatus.

4. The apparatus according to claim 1, wherein the ciphering applied to the device-to-device communication comprises an identifier of an integrity algorithm used to cipher the device-to-device communication between the apparatus and the other apparatus.

5. The apparatus according to claim 1, wherein the apparatus is further caused to at least:
   report, to the radio access node, a success of the re-establishment of the device-to-device communication.

6. The apparatus according to claim 1, wherein the first credential is calculated further based at least on an identifier of the radio access node, an identifier of the apparatus, and/or an identifier of the other apparatus.

7. The apparatus according to claim 1, wherein the apparatus is further caused to at least:
   broadcast a beacon indicating an availability of the apparatus, the broadcasting of the beacon being detectable by the other apparatus and causing the other apparatus to calculate the first credential and send the first message comprising the first credential.

8. The apparatus according to claim 1, wherein the apparatus and/or the other apparatus comprise a user equipment.

9. A method, comprising:
   receiving, at an apparatus, a first message, the first message being received from another apparatus, the first message being responsive to a failure of a device-to-device communication between the apparatus and the other apparatus, the first message comprising a first credential calculated by the other apparatus, the first credential being calculated based at least on a ciphering applied to the device-to-device communication between the apparatus and the other apparatus, and the device-to-device communication being under the control of a radio access node;

verifying, by the apparatus, the first credential, the verifying of the first credential comprising comparing the first credential to a second credential calculated by the apparatus, the second credential being calculated based at least on the ciphering applied the device-to-device communication between the apparatus and the other apparatus; and re-establish the device-to-device communication between the apparatus and the other apparatus by at least sending, to the other apparatus, a second message indicating acknowledgement of the re-establishing of the device-to-device communication, when the apparatus successfully verifies the first credential.

10. The method according to claim 9, further comprising:
calculating the second credential; and
comparing the first credential with the second credential, wherein the first credential is successfully verified if the first credential is equal to the second credential.

11. The method according to claim 9, wherein the ciphering applied to the device-to-device communication comprises a security key used to cipher the device-to-device communication between the apparatus and the other apparatus.

12. The method according to claim 9, wherein the ciphering applied to the device-to-device communication comprises an identifier of an integrity algorithm used to cipher the device-to-device communication between the apparatus and the other apparatus.

13. The method according to claim 9, wherein the first credential is calculated further based at least on an identifier of the radio access node, an identifier of the apparatus, and/or an identifier of the other apparatus.

14. The method according to claim 9, further comprising:
broadcasting a beacon indicating an availability of the apparatus, the broadcasting of the beacon being detectable by the other apparatus and causing the other apparatus to calculate the first credential and send the first message comprising the first credential.

15. A computer program product comprising a non-transient machine-readable medium storing instructions that, when executed by at least one programmable processor, cause the at least one programmable processor to perform operations comprising:
receiving, at an apparatus, a first message, the first message being received from another apparatus, the first message being responsive to a failure of a device-to-device communication between the apparatus and the other apparatus, the first message comprising a first credential calculated by the other apparatus, the first credential being calculated based at least on a ciphering applied to the device-to-device communication between the apparatus and the other apparatus, and the device-to-device communication being under the control of a radio access node;

verifying, by the apparatus, the first credential, the verifying of the first credential comprising comparing the first credential to a second credential calculated by the apparatus, the second credential being calculated based at least on the ciphering applied the device-to-device communication between the apparatus and the other apparatus; and re-establish the device-to-device communication between the apparatus and the other apparatus by at least sending, to the other apparatus, a second message indicating acknowledgement of the re-establishing of the device-to-device communication, when the apparatus successfully verifies the first credential.

16. The computer program product according to claim 15, further comprising:
calculating the second credential; and
comparing the first credential with the second credential, wherein the first credential is successfully verified if the first credential is equal to the second credential.

17. The computer program product according to claim 15, wherein the ciphering applied to the device-to-device communication comprises a security key used to cipher the device-to-device communication between the apparatus and the other apparatus.

18. The computer program product according to claim 15, wherein the ciphering applied to the device-to-device communication comprises an identifier of an integrity algorithm used to cipher the device-to-device communication between the apparatus and the other apparatus.

19. The computer program product according to claim 15, wherein the first credential is calculated further based at least on an identifier of the radio access node, an identifier of the apparatus, and/or an identifier of the other apparatus.

20. The computer program product according to claim 15, further comprising:
broadcasting a beacon indicating an availability of the apparatus, the broadcasting of the beacon being detectable by the other apparatus and causing the other apparatus to calculate the first credential and send the first message comprising the first credential.

* * * * *